US011493744B2

United States Patent
Fischer et al.

(10) Patent No.: US 11,493,744 B2
(45) Date of Patent: Nov. 8, 2022

(54) METHODS AND APPARATUSES FOR CHECKING THE CONFOCALITY OF A SCANNING AND DESCANNING MICROSCOPE ASSEMBLY

(71) Applicant: Abberior Instruments GmbH, Goettingen (DE)

(72) Inventors: Joachim Fischer, Karlsruhe (DE); Matthias Henrich, Heidelberg (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 0 days.

(21) Appl. No.: 17/551,816

(22) Filed: Dec. 15, 2021

(65) Prior Publication Data

US 2022/0113524 A1     Apr. 14, 2022

Related U.S. Application Data

(63) Continuation of application No. PCT/EP2020/066589, filed on Jun. 16, 2020.

(30) Foreign Application Priority Data

Jun. 19, 2019  (DE) ............ 10 2019 116 626.8

(51) Int. Cl.
    *G02B 21/00* (2006.01)
(52) U.S. Cl.
    CPC ....... *G02B 21/0032* (2013.01); *G02B 21/008* (2013.01); *G02B 21/0044* (2013.01); *G02B 21/0048* (2013.01); *G02B 21/0076* (2013.01)
(58) Field of Classification Search
    CPC ............. G02B 21/00; G02B 21/0024; G02B 21/0032; G02B 21/0044; G02B 21/0048;
    (Continued)

(56) References Cited

U.S. PATENT DOCUMENTS 5,751,417 A * 5/1998 Uhl .................. G01J 3/0229
                                                    356/318
6,167,173 A   12/2000 Schoeppe et al.
(Continued)

FOREIGN PATENT DOCUMENTS

DE    19906763 A1   8/2000
DE    19758745 C2   8/2003
(Continued)

OTHER PUBLICATIONS

Written Opinion and international Search Report of related, co-pending PCT/EP2020/066589 dated Sep. 8, 2020 (English WIPO).

*Primary Examiner* — Mustak Choudhury
(74) *Attorney, Agent, or Firm* — Thomas | Horstemeyer, LLP

(57) ABSTRACT

For checking the confocality of a scanning and descanning microscope assembly comprising a light source providing illumination light focused into a focal area in a focal plane, a detector detecting light coming out of the focal area and having a detection aperture to be arranged in a confocal fashion with respect to the focal area, and a scanner, an auxiliary detection aperture of an auxiliary detector arranged in the focal plane is scanned with the focal area of the illumination light to record a first comparison intensity distribution of the illumination light registered by the auxiliary detector, and the detection aperture of the detector is scanned with auxiliary light that exits out of an auxiliary emission aperture of an auxiliary light source concentrically arranged with respect to the auxiliary detection aperture in the focal plane to record a second comparison intensity distribution of the auxiliary light registered by the detector.

23 Claims, 10 Drawing Sheets

(58) Field of Classification Search
CPC ............ G02B 21/0072; G02B 21/0076; G02B 21/008; G02B 27/62; G01N 21/636; G01N 21/6428; G01N 21/6458
See application file for complete search history.

(56) References Cited

U.S. PATENT DOCUMENTS

| | | |
|---|---|---|
| 6,355,919 B1 | 3/2002 | Engelhardt |
| 6,462,345 B1 * | 10/2002 | Simon ................. G02B 21/0064 356/318 |
| 2003/0132394 A1 * | 7/2003 | Wolleschensky .. G01N 21/6458 250/458.1 |
| 2009/0303583 A1 | 12/2009 | Klose et al. |
| 2019/0195800 A1 | 6/2019 | Heine et al. |

FOREIGN PATENT DOCUMENTS

| | | |
|---|---|---|
| DE | 102005020542 S1 | 11/2006 |
| EP | 0978009 A2 | 2/2000 |
| EP | 2098892 A1 | 9/2009 |
| EP | 2333501 A1 | 6/2011 |
| JP | H06-109958 | 4/1994 |
| JP | 4573524 B2 | 11/2010 |
| WO | 9942885 A2 | 8/1999 |
| WO | 2011047365 A1 | 4/2011 |
| WO | 2018042056 A1 | 3/2018 |

* cited by examiner

METHODS AND APPARATUSES FOR CHECKING THE CONFOCALITY OF A SCANNING AND DESCANNING MICROSCOPE ASSEMBLY

CROSS REFERENCE TO RELATED APPLICATIONS

This application is a continuation to International Application PCT/EP2020/066589 with an international filing date of Jun. 16, 2020 entitled "Methods and Apparatuses for Checking the Confocality of a scanning and descanning Microscope Assembly" and claiming priority to German Patent Application No. DE 10 2019 116 626.8 entitled "Verfahren und Vorrichtungen zur Überprüfung der Konfokalität einer scannenden und entscannenden Mikroskopbaugruppe" and filed Jun. 19, 2019.

FIELD OF THE INVENTION

The invention relates to a method of checking the confocality of a scanning and descanning microscope assembly comprising a light source providing illumination light, an optical device focusing the illumination light into a focal area in a focal plane, a detector detecting light coming out of the focal area and having a detection aperture to be arranged in a confocal fashion with respect to the focal area, and a scanner between the light source and the detector on one side, and the focal plane on the other side. Further, the invention relates to an apparatus and to a scanning and descanning microscope assembly for carrying out such a method and to a laser-scanning microscope comprising such a scanning and descanning microscope assembly. Correspondingly, the scanning and descanning microscope assembly particularly is such a one for a laser-scanning microscope. The detection aperture of the detector may particularly be delimited by a pinhole which is arranged in front of the detector and to be arranged in a confocal fashion with respect to the focal area. However, the detection aperture may also be defined by one or more light sensitive areas of the detector.

In a scanning and descanning microscope assembly comprising a light source providing illumination light, an optical device focusing the illumination light into a focal area in a focal plane, a detector for light coming out of the focal area and having a detection aperture to be arranged in a confocal fashion with respect to the focal area, and a scanner between the light source and the detector with the pinhole on one side, and the focal plane on the other side, such that the scanner is configured for scanning with the focused illumination light coming from the light source, on the one hand, and for descanning the light coming out of the focal area towards the detector, on the other hand, a precise confocal arrangement of the detection aperture is important to optimally measure the light caused by the illumination light. Here, the precise confocal arrangement of the detection aperture means that the detection aperture, when being imaged into the focal plane, is arranged in a confocal fashion with respect to the focal area into which the illumination light is focused.

BACKGROUND OF THE INVENTION

A method for adjusting a laser-scanning fluorescence microscope and a corresponding laser-scanning fluorescence microscope comprising an automatic adjustment device are known from international application publication WO 2018/042056 A1. Here, it is the object to set the laser-scanning fluorescence microscope to a correct adjustment in which an intensity maximum of excitation light and an image of a pinhole arranged in front of a fluorescence light detector coincide in a focus of an objective lens. In the known method, a structure in a sample marked with a fluorescent dye is scanned with the intensity maximum of the excitation light to generate pictures of the sample with images of the structure which correspond to different openings of the pinhole. Then, an offset between the positions of the images of the structure in the pictures generated is calculated. For operating the correct adjustment of the laser-scanning fluorescence microscope, the intensity maximum of the excitation light is moved relative to the image of the pinhole in the direction of the offset which the image of the structure comprises in a picture that corresponds to a smaller opening of the pinhole with respect to an image of the structure in another picture that corresponds to a larger opening of the pinhole. The automatic adjustment device of the known laser-scanning fluorescence microscope is configured to automatically execute the known method. The known method requires the presence of the complete laser-scanning fluorescence microscope and the structure marked with the fluorescence dye in the sample to generate the pictures of the sample with the images of the structure. Further, the opening of the pinhole has to variable, or, at least, the pinhole has to be removable, to generate pictures that correspond to different openings of the pinhole.

An apparatus and a method for adjusting the position or size of a pinhole in a laser-scanning microscope are known from German patent application publication DE 10 2005 020 542 A1. Via a separate light source or the laser of the laser-scanning microscope, the pinhole is illuminated and the pinhole is shifted crosswise with respect to the optical axis until an intensity maximum is present on the detector of the laser-scanning microscope arranged behind the pinhole. Then, the opening of the pinhole is at a point which is defined by the optical setup of the laser-scanning microscope with respect to the separate light source or the laser, and which can be found in a reproducible way. A confocality of the laser-scanning microscope may not be checked or adjusted in this way. In the laser-scanning microscope, the known apparatus is completely arranged on the same side of the scanner as the laser and the detector of the laser-scanning microscope.

An autofocus apparatus comprising a light source, a beam splitter, a fiber-optical circulator, an optical collimator, a comparing detector and a microprocessor is known from international application publication WO 2011/047365 A1. The fiber-optical circulator is connected to the beam splitter with one connector, to the optical collimator with a second connector and to the comparing detector with a third connector. The optical collimator directs the one part of the light from the fiber-optical circulator via a dichroitic mirror and a microscope objective onto a sample. The comparing detector uses the other part of the light from the light source as a reference and transforms light coming from a substrate on which the sample is arranged into an analogous voltage signal. Based on the analogous voltage signal of the comparing detector, the microprocessor controls a microscope sample stage. In the fiber-optical circulator, light is exclusively forwarded from the first input to the second input and from the second input to the third input. The comparing detector divides the signal reflected by the substrate by the part of the light from the light source to compensate for variations of the intensity of the light from the light source. The microprocessor controls the microscope sample stage with the goal to maximize or to keep the analogous voltage signal from the comparing detector at a maximum.

A method and an apparatus for calibrating a confocal laser-scanning microscope comprising a light source providing illumination light, an optical device focusing the illumination light in a focal area in a focal plane, a detector detecting light coming out of the focal area and having a detection aperture to be arranged in a confocal fashion with respect to the focal area, and a scanner between the light source and the detector on one side, and the focal plane on the other side, in which the illumination light is directed onto an auxiliary detector via the scanner and auxiliary light from an auxiliary light source is directed onto the detector via the scanner, but without the calibration relating to the confocality of a scanning and descanning microscope assembly, are known from German patent application publication DE 199 06 763 A1. An object is scanned by the laser-scanning microscope with a light beam. For the calibration, in a plane of an intermediate image, calibration means are arranged which can also be scanned with the light beam. The calibration means may be measuring means which are made as detection means and which serves for measuring the laser power or for laser calibration. The detection means may be photodiodes. The calibration means may also be illumination means which serve for calibration of the detector. The illumination means may be light emitting diodes. The calibration means may be swiveled into the area of the field of view in the plane of the intermediate image or they may be arranged in a fixed manner at the border of the intermediate image outside of the actual field of view.

There still is a need of a method and an apparatus which allow for checking the confocality of a scanning and descanning microscope assembly without a complete laser-scanning microscope including the microscope assembly having to be present or a sample having to be measured with such a laser-scanning microscope.

SUMMARY OF THE INVENTION

The present invention relates to a method of checking the confocality of a scanning and descanning microscope assembly comprising a light source providing illumination light, wherein the illumination light exits out of an emission aperture of the light source, an optical device focusing the illumination light into a focal area in a focal plane, a detector detecting light coming out of the focal area and having a detection aperture to be arranged in a confocal fashion with respect to the focal area, and a scanner between the light source and the detector on one side, and the focal plane on the other side. At least one of an auxiliary detector having an auxiliary detection aperture and an auxiliary light source providing auxiliary light and having an auxiliary emission aperture out of which the auxiliary light exits is arranged in the focal plane. In case that both the auxiliary detector and the auxiliary light source are arranged in the focal plane, the auxiliary detection aperture and the auxiliary emission aperture are concentrically arranged in the focal plane. Either the auxiliary detection aperture of the auxiliary detector arranged in the focal plane is scanned with the focal area of the illumination light by operating the scanner, wherein a first intensity distribution of the illumination light registered by the auxiliary detector is recorded over different settings of the scanner; or an auxiliary detection aperture of a separate auxiliary detector which is arranged concentrically with respect to the emission aperture of the light source is scanned with the auxiliary light that exits out of the auxiliary emission aperture of the auxiliary light source arranged in the focal plane by operating the scanner, wherein a first intensity distribution of the illumination light registered by the separate auxiliary detector is recorded over different settings of the scanner. Further, either the detection aperture of the detector is scanned with the auxiliary light which exits out of the auxiliary emission aperture of the auxiliary light source arranged in the focal plane by operating the scanner, wherein a second intensity distribution of the auxiliary light registered by the detector is recorded over the different settings of the scanner; or the auxiliary detection aperture of the auxiliary detector arranged in the focal plane is scanned with auxiliary light which exits out of an auxiliary emission aperture of a separate auxiliary light source concentrically arranged with respect to the detection aperture by operating the scanner, wherein a second intensity distribution of the auxiliary light registered by the auxiliary detector is recorded over the different settings of the scanner. At least one difference between the first intensity distribution and the second intensity distribution over the different settings of the scanner is determined as a measure of an error of the confocality.

More particularly, the present invention relates to such a method in which the scanning and descanning microscope assembly comprises the light source providing the illumination light, the optical device focusing the illumination light into the focal area in the focal plane, the detector detecting the light coming out of the focal area and having the detection aperture to be arranged in a confocal fashion with respect to the focal area, and the scanner between the light source and the detector on one side, and the focal plane on the other side. In this method, the illumination light is directed onto the auxiliary detector via the scanner, and the auxiliary light from the auxiliary light source is directed onto the detector via the scanner. The auxiliary detection aperture of the auxiliary detector arranged in the focal plane is scanned with the focal area of the illumination light by operating the scanner to record the first intensity distribution of the illumination light registered by the auxiliary detector over the different settings of the scanner; and the detection aperture of the detector is scanned with the auxiliary light that exits out of the auxiliary emission aperture of the auxiliary light source concentrically arranged with respect to the auxiliary detection aperture in the focal plane by operating the scanner to record the second intensity distribution of the auxiliary light registered by the detector over the different settings of the scanner.

Further, the invention relates to apparatus configured for being used in such a particular method. The apparatus comprises an auxiliary detector, an auxiliary light source, and a counter-connector fitting to a normalized connector of at least one of a scanning and descanning microscope assembly and a laser-scanning microscope including the scanning and descanning microscope assembly and an objective lens in such a way that an auxiliary detection aperture of the auxiliary detector and an auxiliary emission aperture of the auxiliary light source whose positions are fixed with respect to the counter-connector are arranged in the focal plane of the scanning and descanning microscope assembly with the counter-connector being connected to the connector.

Further, the invention relates to a scanning and descanning microscope assembly configured for checking its confocality. The scanning and descanning microscope assembly comprises a light source providing illumination light, wherein the illumination light exits out of an emission aperture of the light source, an optical device focusing the illumination light into a focal area in a focal plane, a detector for light coming out of the focal area and having a detection aperture to be arranged in a confocal fashion with respect to the focal area, a scanner arranged between the light source and the detector on one side, and the focal plane on the other side, and at least one of an auxiliary detector having an auxiliary detection aperture and an auxiliary light source providing auxiliary light and having an auxiliary emission aperture out of which the auxiliary light exits in the focal plane. In case that both the auxiliary detector and the auxiliary light source are arranged in the focal plane, the auxiliary detection aperture and the auxiliary emission aperture are arranged concentrically. The auxiliary detection aperture of the auxiliary detector in the focal plane is scannable with the focal area of the illumination light or an auxiliary detection aperture of a separate auxiliary detector concentrically arranged with respect to the emission aperture of the light source is scannable with the auxiliary light that exits out of the auxiliary emission aperture of the auxiliary light source arranged in the focal plane by operating the scanner. The detection aperture of the detector is scannable with the auxiliary light which exits in the focal plane out of the auxiliary emission aperture of the auxiliary light source, or the auxiliary detection aperture of the auxiliary detector arranged in the focal plane is scannable with auxiliary light which exits through an auxiliary emission aperture of a separate auxiliary light source concentrically arranged with respect to the detection aperture by operating the scanner.

More particularly, the present invention relates to such a scanning and descanning microscope assembly comprising the light source providing the illumination light, the optical device focusing the illumination light in the focal area in the focal plane, the detector for the light coming out of the focal area and having the detection aperture to be arranged in a confocal fashion with respect to the focal area, the scanner between the light source and the detector on one side, and the focal plane on the other side, the auxiliary detector onto which the auxiliary light is directable via the scanner, and the auxiliary light source providing the auxiliary light whose auxiliary light is directable onto the detector via the scanner, wherein the auxiliary detection aperture of the auxiliary detector and the auxiliary emission aperture out of which the auxiliary light from the auxiliary light source exits are concentrically arranged in the focal plane in such a way that the auxiliary detection aperture is scannable with the focal area of the illumination light by operating the scanner and the detection aperture of the detector is scannable with the auxiliary light from the auxiliary light source by operating the scanner.

Last but not least, the present invention relates to a Laser-scanning microscope comprising an objective and such a scanning and descanning microscope assembly. Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
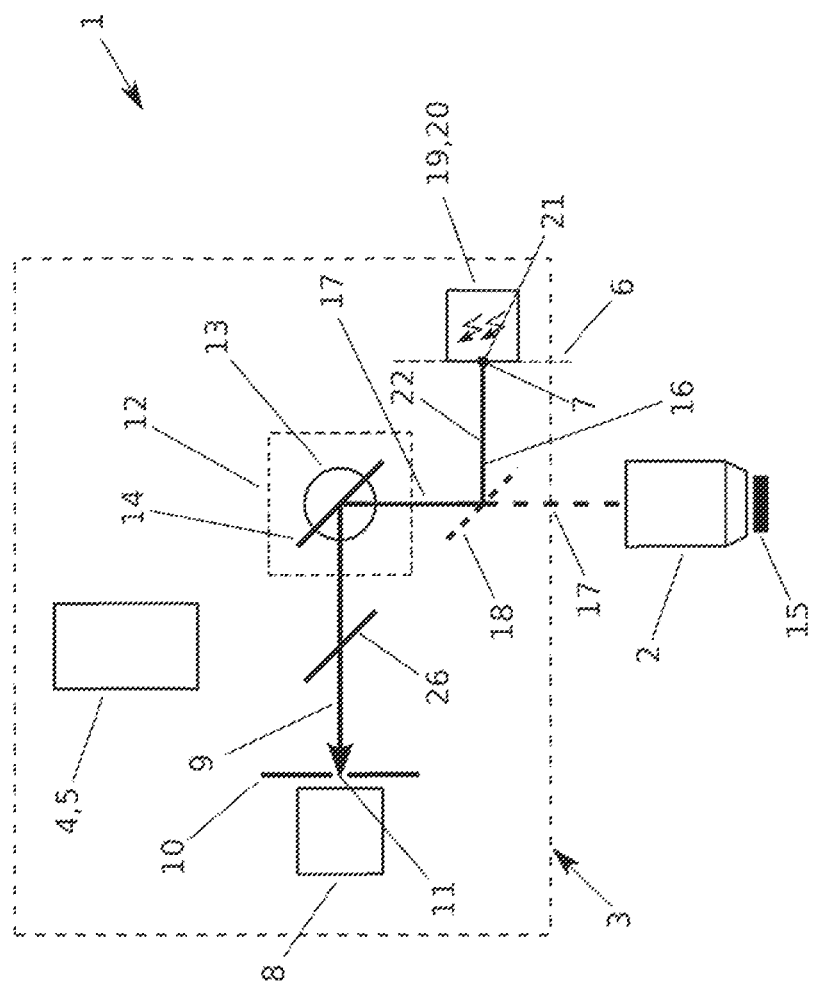
FIG. 1 shows a laser-scanning microscope according to the present disclosure comprising a first embodiment of the microscope assembly according to the present disclosure in executing a step of several embodiments of the method according to the present disclosure.

The method according to the present disclosure serves for checking the confocality of a scanning and descanning microscope assembly comprising a light source providing illumination light, the illumination light exiting out of an emission aperture of the light source, an optical device focusing the illumination light into a focal area in a focal plane, a detector detecting light coming out of the focal area and having a detection aperture to be arranged in a confocal fashion with respect to the focal area, and a scanner between the light source and the detector on one side, and the focal plane on the other side. I. e. the light source and the detector are on one side, and the focal plane is on the other side of the scanner. It has to be stated that the light which is detected with the detector does not need to be emitted out of the focal area in the focal plane considered but may also origin out of another plane. That the detection aperture of the detector is "to be arranged" in a confocal fashion with respect to the focal area, does not define a mandatory step of the method according to the present disclosure, but that the detection aperture of the detector, with given confocality of the scanning and descanning microscope assembly, is arranged in a confocal fashion with respect to the focal area.

In the method according to the present disclosure, an auxiliary detector having at least one of an auxiliary detection aperture and an auxiliary light source providing auxiliary light and having an emission aperture out of which the auxiliary light exits is arranged in the focal plane. I. e. at least the auxiliary detector or the auxiliary light source is arranged in the focal plane. If both the auxiliary detector and the auxiliary light source are arranged there, the auxiliary detection aperture and the auxiliary emission aperture are concentrically arranged in the focal plane. For fulfilling this feature of the method according to the present disclosure, the at least one of the auxiliary detector and the auxiliary light source may be actively arranged in the focal plane. However, the feature is also fulfilled, if the scanning and descanning microscope assembly to be checked for confocality already comprises the at least one of the auxiliary detector and the auxiliary light source in the focal plane.

In the method according to the present disclosure, the detection aperture of the auxiliary detector arranged in the focal plane is scanned with the focal area of the illumination light by operating the scanner, wherein a first intensity distribution of the illumination light registered by the auxiliary detector is recorded over different settings of the scanner. Alternatively, an auxiliary detection aperture of a separate auxiliary detector which is arranged concentrically with respect to the emission aperture of the light source is scanned with the auxiliary light which exits out of the emission aperture of the auxiliary light source arranged in the focal plane by operating the scanner, wherein a first intensity distribution of the illumination light registered by the separate auxiliary detector is recorded over different settings of the scanner. In both cases, the first intensity distribution describes the arrangement of the emission aperture of the light source and thus beam path of the illumination light with respect to the auxiliary device, i. e. the auxiliary detector or the auxiliary light source, arranged in the focal plane.

Further, the detection aperture of the detector is scanned with the auxiliary light that exits out of the emission aperture of the auxiliary light source arranged in the focal plane by operating the scanner, wherein a second intensity distribution of the auxiliary light registered by the detector is recorded over the different settings of the scanner. Alternatively, the auxiliary detection aperture of the auxiliary detector arranged in the focal plane is scanned with auxiliary light that exits out of an emission aperture of a separate auxiliary light source concentrically arranged with respect to the detection aperture of the detector by operating the scanner, wherein a second intensity distribution of the auxiliary light registered by the auxiliary detector is recorded over the different settings of the scanner. In both cases, the second intensity distribution describes the arrangement of the detection aperture of the detector and thus beam path of the light detected by the detector with respect to the auxiliary device, i. e. the auxiliary light source or the auxiliary detector, arranged in the focal plane.

Then, at least one difference between the first intensity distribution and the second intensity distribution over the different settings of the scanner is determined as a measure of an error of the confocality.

It is to be understood that the two intensity distributions for determining the difference are recorded over comparable and typically the same different settings of the scanner. Then, a difference in position between maxima or centers of intensity of the two intensity distributions with respect to these different settings of the scanner directly indicate an error of the confocality of the microscope assembly, i. e. to an offset between the focal area into which the illumination light is focused by the focusing optical device in the focal plane and the image of the detection aperture of the detector in the focal plane or the image of the focal area into which the illumination light is focused by the focusing optical device onto the detection aperture of the detector. Correspondingly, the at least one difference which is preferably determined in the method according to the present disclosure is a difference in position between maxima or centers of intensity of the two intensity distributions.

In order to establish the confocality of the microscope assembly, the at least one difference is compensated. This may be effected by a real relative shift of the detection aperture of the detector with respect to the emission aperture of the light source which can be achieved by shifting a pinhole in front of the detector or by shifting the light source with respect to the detector, or by a virtual relative movement. A virtual relative movement is, for example, achieved by swiveling a mirror or by any other movement of any other optical component in the beam path of the illumination light from the light source or in the beam path of the light out of the focal area towards the detector.

In case of the method according to the present disclosure being executed at a laser-scanning microscope including the scanning and descanning microscope assembly and an objective lens, the at least one of the auxiliary detection aperture of the auxiliary detector and the auxiliary emission aperture of the auxiliary light source may be arranged in an intermediate image plane of the laser-scanning microscope. In doing so, the at least one of the auxiliary detection aperture of the auxiliary detector and the auxiliary emission aperture of the auxiliary light source may be arranged in a region of the respective intermediate image plane which is outside the region that is utilized in scanning an object or sample with the illumination light through the objective lens of the laser-scanning microscope. Alternatively, the at least one of the auxiliary detection aperture of the auxiliary detector and the auxiliary emission aperture of the auxiliary light source may be arranged in a branch branching off the main beam path of a laser-scanning microscope including the scanning and descanning microscope assembly and an objective lens, wherein this branch may even in principle not lead to the object or sample examined with the laser-scanning microscope. This branch may actually branch off at a beam splitter in the main beam path of the laser-scanning microscope, at a deflection mirror which is stationary or non-stationary arranged in the main beam path, or at a rotating mirror of the scanner. The scanners of various laser-scanning microscopes comprise three or four tiltable rotating mirrors, wherein two rotating mirrors are assigned to one or both of the lateral scanning directions. One of these two rotating mirrors per scanning direction may be used to generally orient the scanner towards the at least one of the auxiliary detection aperture and the auxiliary emission aperture. By means of the respective other one of the two mirrors, the auxiliary detection aperture of the respective auxiliary detector or the detection aperture, respectively, may be scanned. However, even many scanners only having one rotating mirror per scanning direction may be used for scanning the auxiliary detection aperture of the auxiliary detector in the branch branching off the main beam path of the laser-scanning microscope and for scanning the detection aperture of the detector with the auxiliary light from the auxiliary light source in the main beam path. Thus, if a suitable scanner is present, a photoelectric component useable both as an auxiliary light source and as an auxiliary detector is sufficient for implementing the method according to the present disclosure in the simplest case.

Additionally, a part of the optical device focusing the illumination light into the focal area in the focal plane may be arranged in the branch branching off the main beam path of the laser-scanning microscope. In this context it should be noted that, even if the auxiliary detection aperture of the auxiliary detector and the auxiliary emission aperture of the auxiliary light source are concentrically arranged in the focal plane in the method according to the present disclosure, this does not imperatively mean that the auxiliary light source and the auxiliary detector have also in reality to be arranged in the same focal plane. Instead, at least one of the auxiliary detection aperture and the auxiliary emission aperture may also be arranged in the focal plane in that the auxiliary light source or the auxiliary detector is imaged thereto. Further, the focal plane in which the at least one of the auxiliary detection aperture and the auxiliary emission aperture is arranged does not need to be identical to any intermediate image plane of the laser-scanning microscope via which the illumination light gets from the light source through the objective lens to an object or sample to be examined and light from the object or sample caused by the illumination light gets through the objective lens to the detector. Instead, the focal plane in which the at least one of the auxiliary detection aperture and the auxiliary emission aperture is arranged may be offset or tilted or both offset and tilted with respect to any intermediate image plane of the laser-scanning microscope.

In a first embodiment of the method according to the present disclosure, the auxiliary detection aperture of the auxiliary detector arranged in the focal plane is scanned with the focal area of the illumination light by operating the scanner to record the first intensity distribution of the illumination light registered by the auxiliary detector over the different settings of the scanner. Further, the detection aperture of the detector is scanned with the auxiliary light from the auxiliary light source which exits out of the auxiliary emission aperture of the auxiliary light source concentrically arranged with respect to the auxiliary detection aperture in the focal plane by operating the scanner to record the second intensity distribution of the auxiliary light registered by the detector over the different settings of the scanner.

In the first embodiment of the method according to the present disclosure, the auxiliary detection aperture and the auxiliary emission aperture may not only be concentric but congruent in the focal plane. A congruence may, for example be achieved in that the same photoelectrical component is used as the auxiliary light source and the auxiliary detector. Actually, this photoelectric component may be a light emitting diode, a super-luminescence diode, a laser diode or a photodiode. It is known to one skilled in the art that these photoelectric components may be operated or connected such that they may be used as a light source, on the one hand, and as a detector for light, on the other hand.

In the first embodiment of the method according to the present disclosure, the auxiliary detection aperture and the auxiliary emission aperture may also be formed by a terminal cross-section of an optical fiber arranged in the focal plane. In principle, this optical fiber may also lead to a photoelectric component which is used both as an auxiliary light source and as an auxiliary detector. Alternatively, the optical fiber may be branched towards the auxiliary light source and the auxiliary detector, for example via a free beam-beam splitter, a fiber beam splitter or a circulator. Then, without problem, separate photoelectric components may be used for the auxiliary light source and the auxiliary detector. When using a circulator, it is avoided without further efforts that only a part of the illumination light entering into the optical fiber via its terminal cross-section gets to the auxiliary detector or only a part of the auxiliary light from the auxiliary light source exits out of the optical fiber via the terminal cross-section.

In a second embodiment of the method according to the present disclosure, the auxiliary detection aperture of the auxiliary detector arranged in the focal plane is scanned with the focal area of the illumination light by operating the scanner to record the first intensity distribution of the illumination light registered by the auxiliary detector over the different settings of the scanner like in the first embodiment. However, deviating from the first embodiment, the auxiliary detection aperture of the auxiliary detector arranged in the focal plane is scanned with auxiliary light that exits out of the auxiliary emission aperture of the separate auxiliary light source which is arranged concentrically with respect to the detection aperture of the detector by means of operating the scanner to record the second intensity distribution of the auxiliary light registered by the auxiliary detector over the different settings of the scanner. Thus, in the second embodiment of the method according to the present disclosure, the detection beam path is passed by the auxiliary light in a direction which is opposite to the direction of the light normally registered by the detector and coming out of the focal plane. Nevertheless, the second intensity distribution here also describes the arrangement of the detection aperture of the detector—in form of the arrangement of the auxiliary emission aperture of the auxiliary light source concentric thereto—with respect to the auxiliary device—in form of the auxiliary detector—in the focal plane.

In a third embodiment of the method according to the present disclosure, deviating from the first embodiment, the auxiliary detection aperture of the separate auxiliary detector concentrically arranged with respect to the emission aperture of the light source is scanned with the auxiliary light that exits out of the auxiliary emission aperture of the auxiliary light source arranged in the focal plane by means of operating the scanner to determine the first intensity distribution of the illumination light registered by the auxiliary detector over the different settings of the scanner. On the other hand, the detection aperture of the detector is scanned with the auxiliary light that exits out of the auxiliary emission aperture of the auxiliary light source arranged in the focal plane by means of operating the scanner to record the second intensity distribution of the auxiliary light registered by the detector over the different settings of the scanner like in the first embodiment. Here, the first intensity distribution describes the arrangement of the emission aperture of the light source—in form of the arrangement of the auxiliary detection aperture of the auxiliary detector—with respect to the auxiliary device—in form of the auxiliary light source—in the focal plane.

In principle, even a fourth embodiment of the method according to the present disclosure is possible in which, deviating from the first embodiment, the auxiliary detection aperture of the separate auxiliary detector concentrically arranged with respect to the emission aperture of the light source is scanned with the auxiliary light that exits through the auxiliary emission aperture of the auxiliary light source arranged in the focal plane to record the first intensity distribution of the illumination light registered by the auxiliary detector over the different positions of the scanner, and in which, also deviating from the first embodiment, the auxiliary detection aperture of the auxiliary detector arranged in the focal plane is scanned with auxiliary light that exits out of the auxiliary emission aperture of the separate auxiliary light source concentrically arranged with respect to the detection aperture by means of operating the scanner to record the second intensity distribution of the auxiliary light detected by the auxiliary detector over the different settings of the scanner.

For executing the first embodiment of the method according to the present disclosure, an apparatus comprising an auxiliary detector and an auxiliary light source may be used which comprises a counter-connector that fits to a normalized or standardized connector of the scanning and descanning microscope assembly or to such a normalized or standardized connector of a laser-scanning microscope including the scanning and descanning microscope assembly and an objective lens in such a way that an auxiliary detection aperture of the auxiliary detector and an auxiliary emission aperture of the auxiliary light source whose positions are fixed with respect to the counter-connector are arranged in the focal plane of the scanning and descanning microscope arrangement when the counter-connector is connected to the connector. This apparatus may then be connected to the respective microscope assembly or the respective laser-scanning microscope via its standardized connector to check the microscope assembly and thus, if present, also the entire laser-scanning microscope for confocality.

In an extreme case, the apparatus according to the present disclosure only consists of the counter-connector and an electro-optical component arranged in a fixed relative position thereto, which may be used both as an auxiliary detector and as an auxiliary light source, and the corresponding circuitry for operating this component as an auxiliary detector, on the one hand, and as an auxiliary light source, on the other hand.

In executing all embodiments of the method according to the present disclosure, the auxiliary detector and the auxiliary light source may be integrated into the scanning and descanning microscope assembly. A corresponding scanning and descanning microscope assembly according to the present disclosure for carrying out the method according to the present disclosure comprises a light source providing illumination light, the illumination light exiting out of an emission aperture of the light source, an optical device focusing the illumination light into a focal area in a focal plane, a detector for light coming out of the focal area, which has a detection aperture to be arranged in a confocal fashion with respect to the focal area, a scanner between the light source and the detector on one side, and the focal plane on the other side, and at least one of an auxiliary detector having an auxiliary detection aperture and an auxiliary light source providing auxiliary light and having an auxiliary emission aperture out of which the auxiliary light exits in the focal plane. If both the auxiliary detector and the auxiliary light source are arranged in the focal plane, the auxiliary detection aperture and the auxiliary emission aperture are arranged concentrically. By operating the scanner, the auxiliary detection aperture of the auxiliary detector in the focal plane is scannable with the focal area of the illumination light, or an auxiliary detection aperture of a separate auxiliary detector concentrically arranged with respect to the emission aperture of the auxiliary light source is scannable with the auxiliary light that exits out of the auxiliary emission aperture of the auxiliary light source arranged in the focal plane. Further, by means of operating the scanner, the detection aperture of the detector is scannable with the auxiliary light that exits out of the auxiliary emission aperture of the auxiliary light source in the focal plane, or the auxiliary detection aperture of the auxiliary detector arranged in the focal plane is scannable with auxiliary light that exits out of an auxiliary emission aperture of a separate auxiliary light source concentrically arranged with respect to the detection aperture.

Preferably, a microscope assembly according to the present disclosure comprises a checking device which is configured for scanning the auxiliary detection aperture of the auxiliary detector in the focal plane with the focal area of the illumination light or the auxiliary detection aperture of the separate auxiliary detector concentrically arranged with respect to the emission aperture of the light source with the auxiliary light from the auxiliary light source in the focal plane by means of operating the scanner, and to record a first intensity distribution of the illumination light registered by the auxiliary detector or of the auxiliary light registered by the separate auxiliary detector over different settings of the scanner, which is further configured for scanning the detection aperture of the detector with the auxiliary light from the auxiliary light source in the focal plane or the auxiliary detection aperture of the auxiliary detector arranged in the focal plane with the auxiliary light exiting out of the auxiliary emission aperture of the separate auxiliary light source concentrically arranged with respect to the detection aperture of the detector by means of operating the scanner and to record a second intensity distribution of the auxiliary light registered by the detector or of the auxiliary light registered by the auxiliary detector over the different settings of the scanner, and which is further configured to determine at least one difference between the first intensity distribution and the second intensity distribution over the different settings of the scanner as a measure for an error of the confocality of the microscope assembly.

A scanning and descanning microscope assembly according to the present disclosure for executing the first embodiment of the method according to the present disclosure comprises the light source providing the illumination light, the optical device focusing the illumination light into the focal area in the focal plane, the detector for the light coming out of the focal area, which has the detection aperture to be arranged in a confocal fashion with respect to the focal area, and the scanner between the light source and the detector on one side, and the focal plane on the other side. The auxiliary detection aperture of the auxiliary detector onto which the illumination light is directable via the scanner and the auxiliary emission aperture of the auxiliary light source out of which the auxiliary light from the auxiliary light source exits which is directable onto the detection aperture of the detector via the scanner are concentrically arranged in the focal plane such that the auxiliary detection aperture is scannable with the focal area of the illumination light by operating the scanner and the detection aperture of the detector is scannable with the auxiliary light coming from the auxiliary light source by operating the scanner. For this purpose, the scanner is to be arranged between the light source and the detector on one side, such that these components are located on one side of the scanner, and the auxiliary detector and the auxiliary light source on the other side, so that these components are located on the other side of the scanner. Also here, it has to be noted that this arrangement may otherwise be real or virtual as it has already been explained in the context of the method according to the present disclosure.

A scanning and descanning microscope assembly according to the present disclosure for carrying out the second embodiment of the method according to the present disclosure comprises the light source providing the illumination light, the optical device focusing the illumination light into the focal area in the focal plane, the detector for the light coming out of the focal area, which has the detection aperture to be arranged in a confocal fashion with respect to the focal area, the scanner between the light source and the detector on one side, and the focal plane on the other side, and the auxiliary detector onto which the illumination light is directable via the scanner. Here, the auxiliary detection aperture of the auxiliary detector is arranged in the focal plane in such a way, and the auxiliary emission aperture of the separate auxiliary light source providing the auxiliary light is arranged concentrically with respect to the detection aperture of the detector in such a way that the auxiliary detection aperture of the auxiliary detector is scannable with the focal area of the illumination light, on the one hand, and with the auxiliary light exiting out of the auxiliary emission aperture of the auxiliary light source, on the other hand, by operating the scanner.

A scanning and descanning microscope assembly according to the present disclosure for carrying out the third embodiment of the method according to the present disclosure comprises the light source providing the illumination light, the illumination light exiting out of the emission aperture of the light source, the optical device focusing the illumination light into the focal area in the focal plane, the detector for the light coming out of the focal area which has the detection aperture to be arranged in a confocal fashion with respect to the focal area, the scanner between the light source and the detector on one side, and the focal plane on the other side, and the auxiliary light source providing the auxiliary light, the auxiliary light being directable onto the detector via the scanner. Here, the auxiliary emission aperture of the auxiliary light source out of which the auxiliary light exits, is arranged in the focal plane in such a way, and the auxiliary detection aperture of the separate auxiliary detector is arranged concentrically with respect to the emission aperture of the light source in such a way that the auxiliary detection aperture of the separate auxiliary detector, on the one hand, and the detection aperture of the detector, on the other hand, are scannable with the auxiliary light coming from the auxiliary light source by operating the scanner.

A scanning and descanning microscope assembly according to the present disclosure for carrying out the fourth embodiment of the method according to the present disclosure comprises the light source providing the illumination light, the illumination light exiting out of the emission aperture of the light source, the optical device focusing the illumination light into the focal area in the focal plane, the detector for the light coming out of the focal area which has the detection aperture to be arranged in a confocal fashion with respect to the focal area, the scanner between the light source and the detector on one side, and the focal area on the other side, the auxiliary detector onto which the illumination light is directable via the scanner, and the auxiliary light source providing the auxiliary light, the auxiliary light being directable onto the detector via the scanner. Here, the auxiliary detection aperture of the auxiliary detector and the auxiliary emission aperture of the auxiliary light source are concentrically arranged in the focal plane in such a way, the auxiliary emission aperture of the separate auxiliary light source providing the auxiliary light is concentrically arranged with respect to the detection aperture of the detector in such a way, and the auxiliary detection aperture of the separate auxiliary detector is arranged concentrically with respect to the emission aperture of the light source in such a way that the auxiliary detection aperture of the auxiliary detector is scannable with the auxiliary light exiting out of the auxiliary emission aperture of the auxiliary light source by operating the scanner and that the auxiliary detection aperture of the separate auxiliary detector is scannable with the auxiliary light from the auxiliary light source by operating the scanner.

Preferred embodiments of the microscope assembly according to the present disclosure have already been explained in the context of the method according to the present disclosure.

In a laser-scanning microscope according to the present disclosure comprising an objective lens and a scanning and descanning microscope assembly according to the present disclosure, the at least one of the auxiliary detection aperture of the auxiliary detector and the auxiliary emission aperture of the auxiliary light source may be arranged in an immediate image plane of the laser-scanning microscope or in a branch branching off a main beam path of the laser-scanner microscope. This branch may branch off at a beam splitter in the main beam path of the laser-scanning microscope, at a deflection mirror or at a rotating mirror of the scanner. Alternatively or additionally, at least a part of the optical device focusing the illumination light into the focal area in the focal plane may be arranged in the branch.

In all embodiments of the scanning and descanning microscope assembly according to the present disclosure and the laser-scanning microscope according to the present disclosure the detection aperture of the detector may be delimited by a pinhole arranged in front of the detector, i. e. its light-sensitive area.

In all embodiments of the scanning and descanning microscope assembly according to the present disclosure and the laser-scanning microscope according to the present disclosure, the detector may be a point detector or an array detector. The array detector may have a small field of 2×2 to 10×10 light-sensitive elements, or it may have, for example 13, light-sensitive elements arranged in a hexagonal grid to register the airy disc of the light coming out of the focal area in the focal plane and imaged onto the detector with spatial resolution. With an array detector, the second intensity distribution of the auxiliary light registered by the detector may be the sum of the individual intensity light distributions registered by all or some of the individual elements over the different settings of the scanner or only a selected single one of these individual intensity distributions. It is also possible to determine the relative positions of the individual elements of the array detector with respect to the auxiliary emission aperture of the auxiliary light source in the focal plane from the differences between the individual intensity distributions.

Generally, even each auxiliary detector may not only be a point detector but also an array detector.

Now referring in greater detail to the drawings, the laser-scanning microscope 1 schematically depicted in FIG. 1 includes an objective lens 2 and a microscope assembly 3 whose components are surrounded by a dashed line. A light source 4 for providing illumination light, for example a laser 5, belongs to the microscope assembly 3. However, in the step of the method according to the present disclosure illustrated in FIG. 1, the light source 4 is not activated to provide the illumination light. Further, an optical device focusing the illumination light into a focal area 7 in a focal plane 6 belongs to the microscope assembly 3. In FIG. 1, the focal plane 6 is drawn-in as a dashed line, and the focal area 7 in the focal plane 6 is drawn-in as a point. The components of the focusing optical device are not depicted. Further, a detector 8 for light 9 coming out of the focal area 7 belongs to the microscope assembly 3. A pinhole 10 is located in front of the actual detector 8, i. e. its light-sensitive area. The opening of the pinhole 10 defines a detection aperture 11 of the detector 8 which, with a correct adjustment of the microscope assembly 3, is arranged in a confocal fashion with respect to the focal area 7. A scanner 12 of the microscope assembly 3 only schematically depicted in FIG. 1 is arranged between the light source 4 and the detector 8 with the pinhole 10 on one side, and the focal plane 6 on the other side. The scanner includes at least one rotating mirror 13, 14 per lateral direction in which the scanner is provided for scanning a sample arranged in front of the objective lens 2 with the illumination light from the light source 4. However, the scanner 12 does not only serve for scanning the sample 15, but also for descanning the light 9 that is caused by the illumination light in the sample 15 so that this light is selectively recorded by the detector 8. Here, an exact confocality of the microscope assembly 3, i. e. an exact coincidence of the focal area 7 of the illumination light focused into the sample 15 and an image of the opening of the detection aperture 11 of the detector 8 in the sample 15, is essential. In the method according to the present disclosure, this confocality is checked in the focal plane 11 drawn in FIG. 1. In the present embodiment, this focal plane 6 is located in a branch 16 branching off the main beam path 17 of the laser-scanning microscope 1. The branch 19 branches off the main beam path 17 at a beam splitter 18. In the branch 16, a photoelectrical component 19 is arranged which is used as an auxiliary light source in the step of the method according to the present disclosure which is illustrated in FIG. 1. The auxiliary light source 20 comprises an auxiliary emission aperture 21 in the focal plane 6. In the step according to FIG. 1, by means of operating the scanner 12, the detection aperture 11 of the detector 8 is scanned with auxiliary light 22 from the auxiliary light source 20 which exits out of the auxiliary emission aperture 21 in the focal plane 6. At the same time, an intensity distribution of the auxiliary light 22 registered by the detector 8 over the different settings of the scanner 12 is recorded, i. e. assigned to the different settings of the scanner 12. In other words, a scan image of the detection aperture 11 of the detector 8 is recorded with the aid of the auxiliary light source 20.

Figure 2:
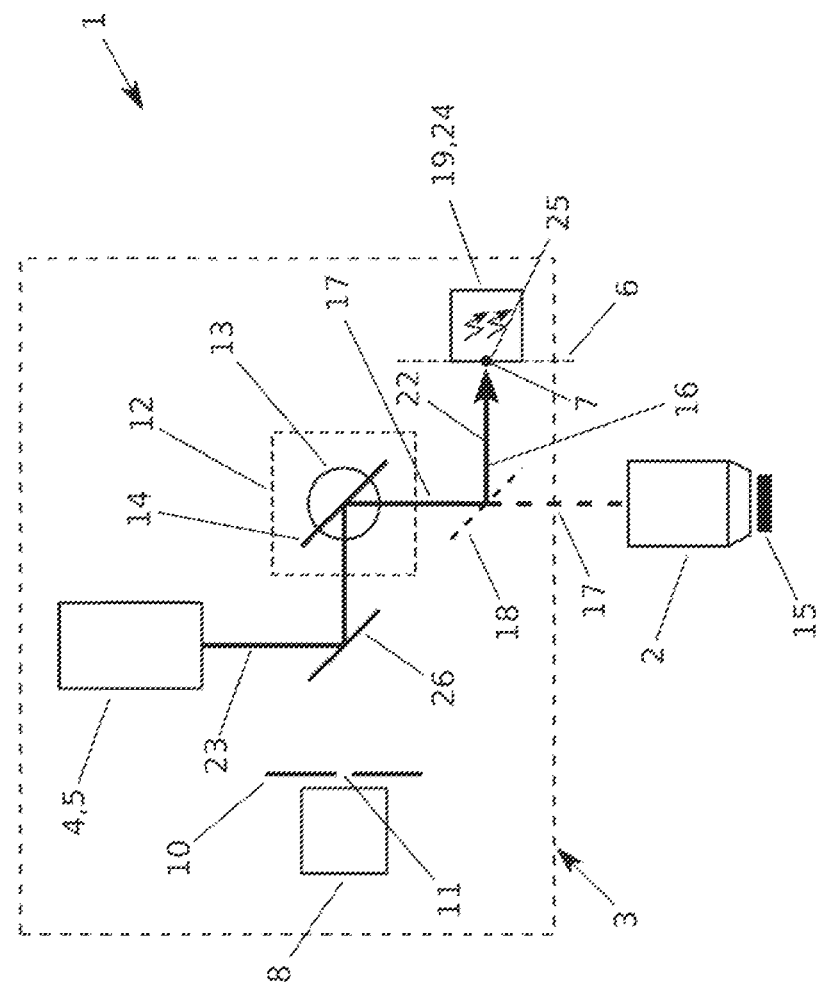
FIG. 2 shows the laser-scanning microscope according to the present disclosure of FIG. 1 in carrying out a further step of several embodiments of the method according to the present disclosure.

In the step of the method according to the present disclosure which is depicted in FIG. 2, the light source 4 is activated for providing the illumination light 23, and the photoelectric component 19 is used as an auxiliary detector 24. Then, an auxiliary detection aperture 25 of the auxiliary detector 24 which is located in the focal plane 6 concentrically with respect to the auxiliary emission aperture 21 is scanned with the illumination light 23, wherein a further intensity distribution of the illumination light 23 registered by the auxiliary detector 24 is recorded over the different settings of the scanner 12. Thus, in this step, a scan image of the auxiliary detection aperture 25 of the auxiliary detector 24 in the focal plane 6 is recorded. The scan image of the detection aperture 11 of the detector 8 recorded according to FIG. 1 and the scan image of the auxiliary detection aperture 25 recorded according to FIG. 2 are concentrically with respect to the associated different settings of the scanner 12, if the opening of the pinhole 10 is arranged in an exactly confocal fashion with respect to the focal area 7 in the focal plane 6 into which the illumination light 23 is focused. A concentricity of the two scan images particularly means that at least the maxima of the two intensity distributions or their centers of intensity coincide. Each noticeable difference in position between the maxima or the centers of intensity indicates an error of the confocality of the microscope assembly 3 which is to be compensated for by a real or virtual relative movement of the light source 4 with respect to the detector 8 or its detection aperture 11 to correctly adjust the microscope assembly 3. Such a virtual relative movement may, for example, be achieved by tilting a beam splitter 26 on that side of the scanner 12 facing away from the objective 2, the beam splitter 26 merging or separating the illumination light 23 from the light source 4 and the light 9 towards the detector 8.

Figure 3:
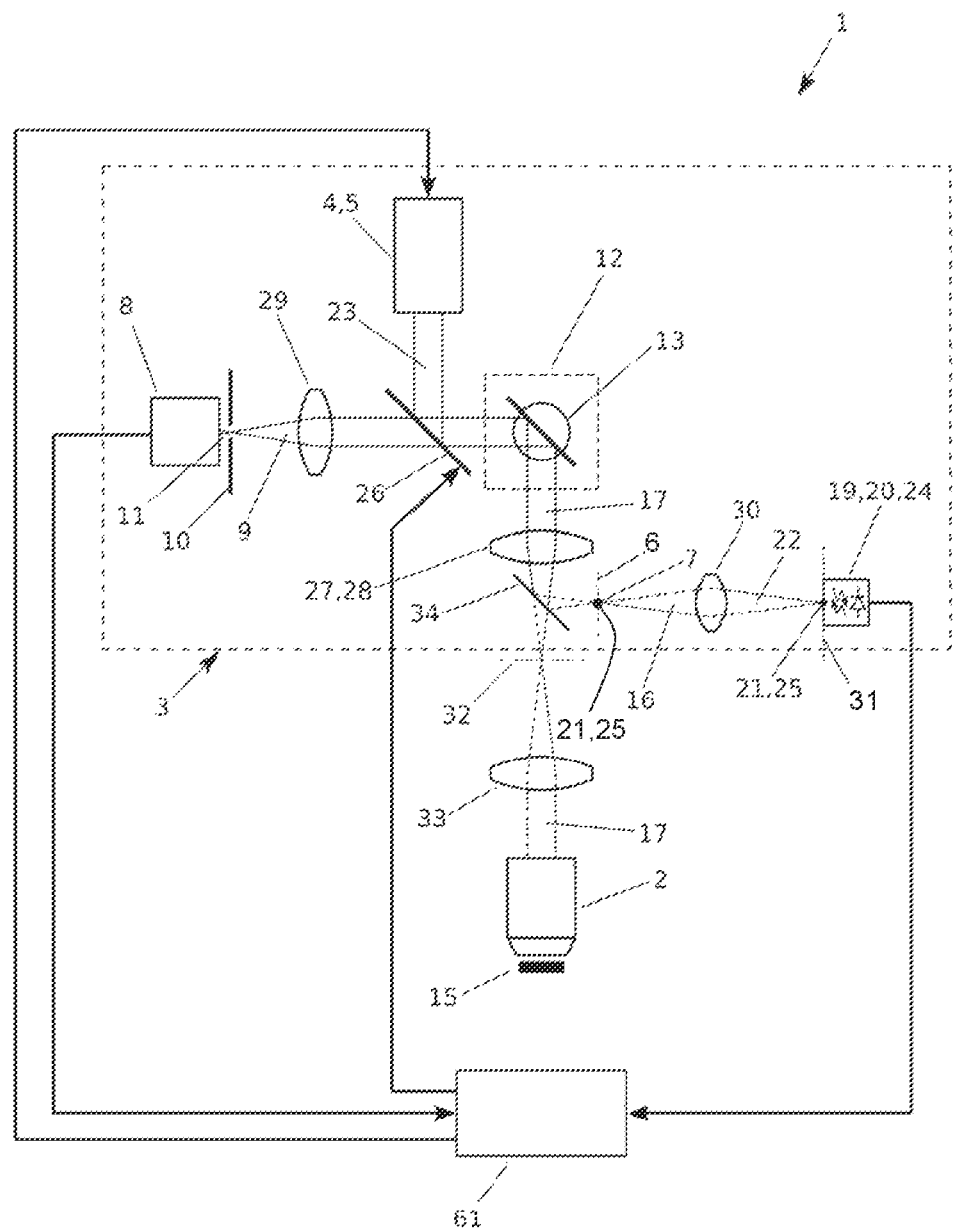
FIG. 3 shows a further embodiment of the laser-scanning microscope according to the present disclosure comprising a second embodiment of the microscope assembly according to the present disclosure.

In the depiction of the laser-scanning microscope 1 in FIG. 3, the optical device 27 which focusses the illumination light into the focal area 7 in the focal plane 6 is shown. This optical device includes a so-called scan lens 28. A further optical device 29 focusses the descanned light 9 to be detected by the detector 8 onto the opening of the pinhole 10, i. e. into the detection aperture 11 of the detector 8. By means of an even further optical device 30, the photoelectrical component 19 is imaged in the focal plane 6 to virtually arrange the auxiliary detection aperture 25 and the auxiliary emission aperture 21 in the focal plane 6. Alternatively, one may regard the optical device 30 as a part of the optical device 27 and, correspondingly, the focal plane 6 drawn-in in FIG. 3 as an intermediate focal plane and the further focal plane 31 drawn-in in FIG. 3, in which the photoelectrical component 19 is arranged, as that focal plane in which the auxiliary emission aperture 21 of the auxiliary light source 20 is then in reality concentrically arranged with respect to the auxiliary detection aperture 25 of the auxiliary detector 24. Generally, the optical device 27 may have one or more intermediate focal planes between the light source 4 and the detector 8 with the pinhole 10 on one side, and the focal plane 6 in which the photoelectric component 19 is arranged on the other side. The focal plane 6 in the branch 16 drawn-in in FIG. 3 corresponds to an intermediate image plane 32 in the main beam path 17 of the scanning microscope 1. In this main beam path 17, between the intermediate image plane 32 and the objective lens, a tube lens 33 is arranged. Further, FIG. 3, instead of the beam splitter 16 according to FIGS. 1 and 2, shows a deflection mirror 34 which is temporarily brought into the main beam path 17 to activate the branch 16 towards the focal plane 6 for carrying out the method according to the present disclosure.

In the embodiment of the laser-scanning microscope 1 according to FIG. 3, a checking device 61 automatically executes the steps of the method according to the present disclosure explained with reference to FIGS. 1 and 2 in generally the same way and controls the photoelectric component 19, the light source 4 and a not separately depicted operating drive for the beam splitter 26 for this purpose and reads in the intensities of the auxiliary light 22 or the illumination light 23 registered by the detector 8 and the photoelectrical component 19 operated as the auxiliary detector 24. The checking device 61 may be provided with all microscope assemblies 3 according to the present disclosure and even if a microscope assembly according to the prior art is temporarily combined with an apparatus according to the present disclosure for carrying out the method according to the present disclosure as it will be explained referring to the following FIG. 4.

Figure 4:
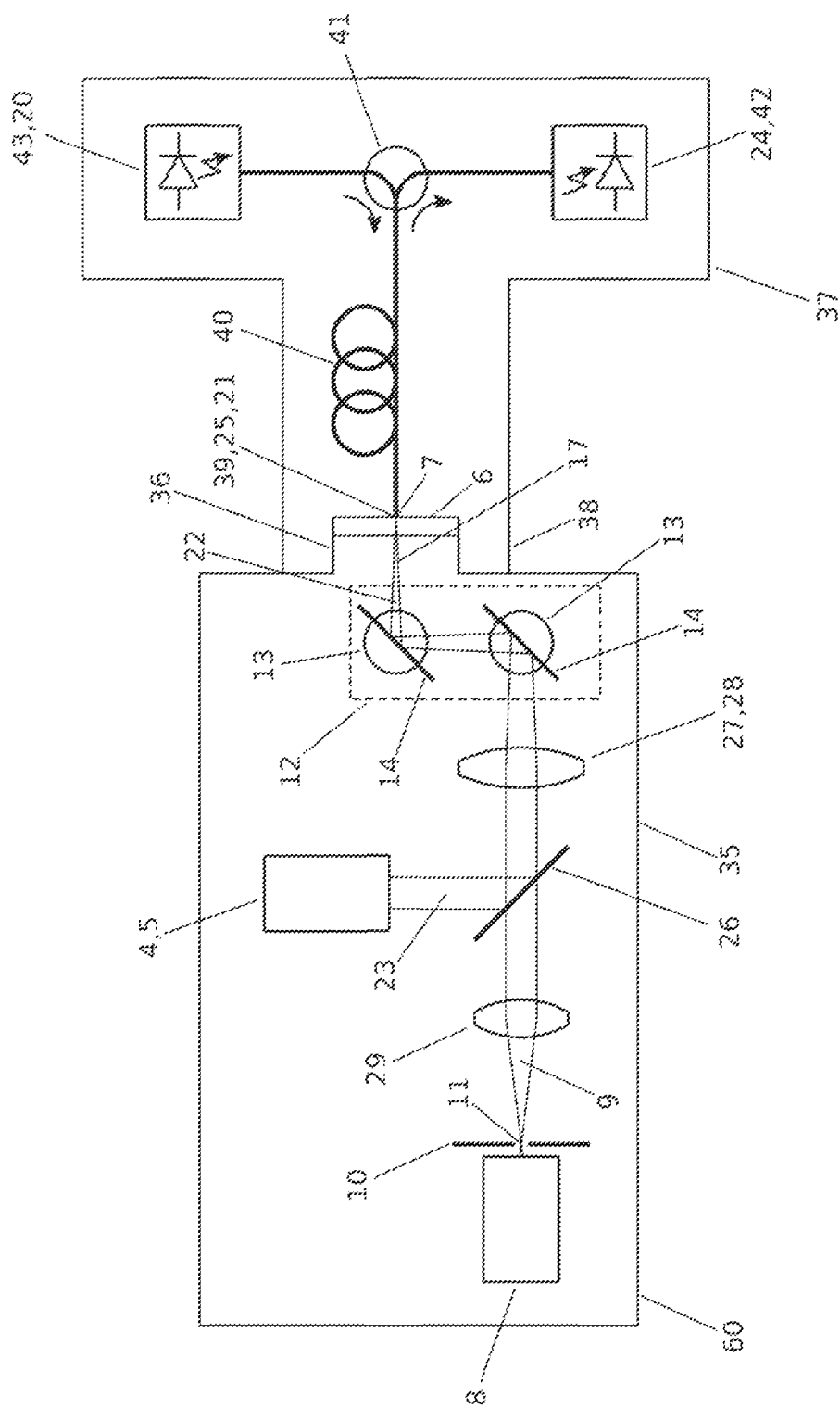
FIG. 4 shows a scanning and descanning microscope assembly with a connected apparatus according to the present disclosure.

FIG. 4 does not show a complete laser-scanning microscope, but only a scanning and descanning microscope assembly 60 for such a laser-scanning microscope. This scanning and descanning microscope assembly 60 according to FIG. 4 as such corresponds to the prior art. Deviating from FIGS. 1 to 3, the scanner 12 comprises a total of four rotating mirrors 13 and 14, two rotating mirrors 13 being assigned to one and two rotating mirrors 14 being assigned the other of the two deviation directions of the scanner 12. The scan lens 28 of the optical device 27 is on that side of the scanner 12 facing towards the light source 4 and the detector 8. On that side of the scanner 12 facing away from the light source 4 and the detector 8, a connector 36 is formed at a housing 35 or any other supporting structure of the microscope assembly 60 to align the microscope assembly 60 with respect to a corresponding connector and to support the microscope assembly 60 at the corresponding connector, particularly a camera connector of a light microscope comprising the objective lens 2 according to FIGS. 1 to 3. However, according to FIG. 4, an apparatus 37 comprising a counter-connector 38 fitting to the connector 36 is supported at the connector 36 in such a way that a terminal cross-section 39 of an optical fiber 40 is arranged in the focal plane 6 in which the optical device 27 focusses the illumination light 23. Via a fiber optical circulator 41, the optical fiber 40 leads to a photodiode 42 serving as an auxiliary detector 24. Via the same circulator 41, a laser diode 43 is connected to the optical fiber 40 as the auxiliary light source 20. The circulator 41 leads the illumination light entering into the terminal cross-section 39 of the optical fiber 40 exclusively towards the auxiliary detector 24, whereas it leads the auxiliary light 22 from the auxiliary light source 20 exclusively towards to the terminal cross-section 39 of the optical fiber 40. The terminal cross-section 39 of the optical fiber 40 forms the auxiliary detection aperture 25 and the auxiliary emission aperture 21 in the focal plane 6. According to FIG. 4, this focal plane 6 is in the main beam path 17. Using the apparatus 37, the method according to the present disclosure is executable to check the microscope assembly 60 with regard to the confocal arrangement of the opening 11 of the pinhole 10 with respect to the focal area 7 into which the illumination light 23 is focused in the focal plane 6 and to determine and to then correct any errors of the confocality by relative movements of the pinhole 10 with respect to the light source 4.

If the auxiliary detector 24, like according to FIG. 4, is a component separated from the auxiliary light source 20, the two steps of the method according to the present disclosure explained with reference to FIGS. 1 and 2 may also be executed simultaneously, the two intensity distributions whose differences indicate an error of the confocality of the microscope assembly 60 being simultaneously recorded with the detector 8 and the auxiliary detector 24. Then, the two intensity distributions are automatically assigned to the same different settings of the scanner 12.

Figure 5:
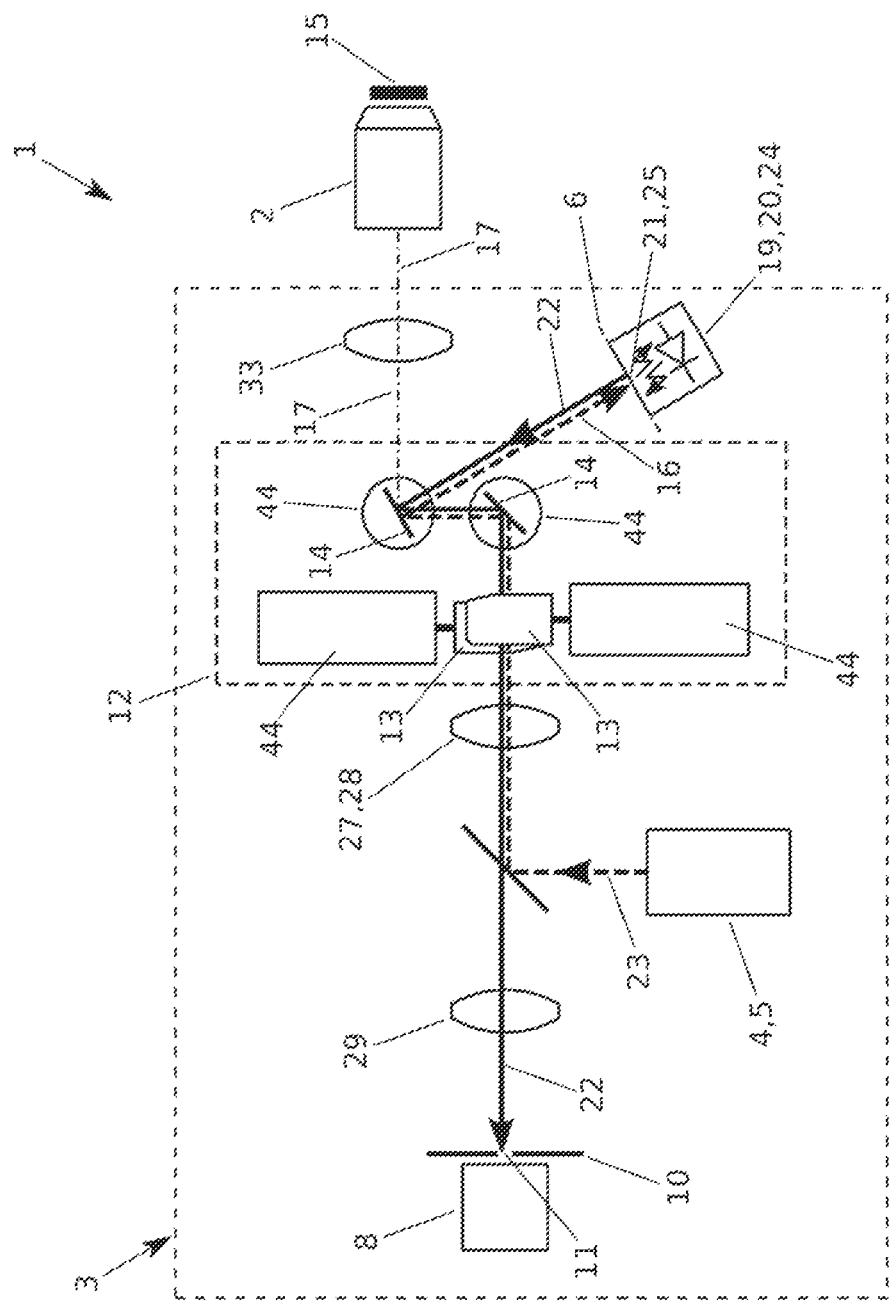
FIG. 5 shows a further embodiment of the laser-scanning microscope according to the present disclosure comprising a third embodiment of the microscope assembly according to the present disclosure.

In the embodiment of the laser-scanning microscope 1 according to the present disclosure of FIG. 5, the microscope assembly 3 generally corresponds to that one of FIG. 4. However, it is a microscope assembly according to the present disclosure having an integrated photoelectric component 19 which is used as the auxiliary light source 20 and the auxiliary detector 24. Here, in contrast to FIGS. 1 to 3, no additional beam splitter 18 or deflection mirror 34 is arranged in the main beam path 17 to deflect the illumination light 23 towards the auxiliary detector 24 arranged in the branch 16 and to direct the auxiliary light 22 from the auxiliary light source 20 towards the detector 8, but one rotating mirror 14 of the four rotating mirrors 13, 14 which are depicted here inclusive of their rotation drives 44 is used for this purpose. The other rotating mirrors 13, 14 may then be used for scanning the auxiliary detection aperture 25 of the auxiliary detector 24 and the detection aperture 11 of the detector 8, respectively. The photoelectric component 19 is in a spatially fixed position with respect to the further components of the microscope assembly 3, in which the auxiliary detection aperture 25 and the auxiliary emission aperture 21 are in the focal plane 6 and in which the photoelectric component 19 is accessible with the illumination light 23 via the scanner 12.

Figure 6:
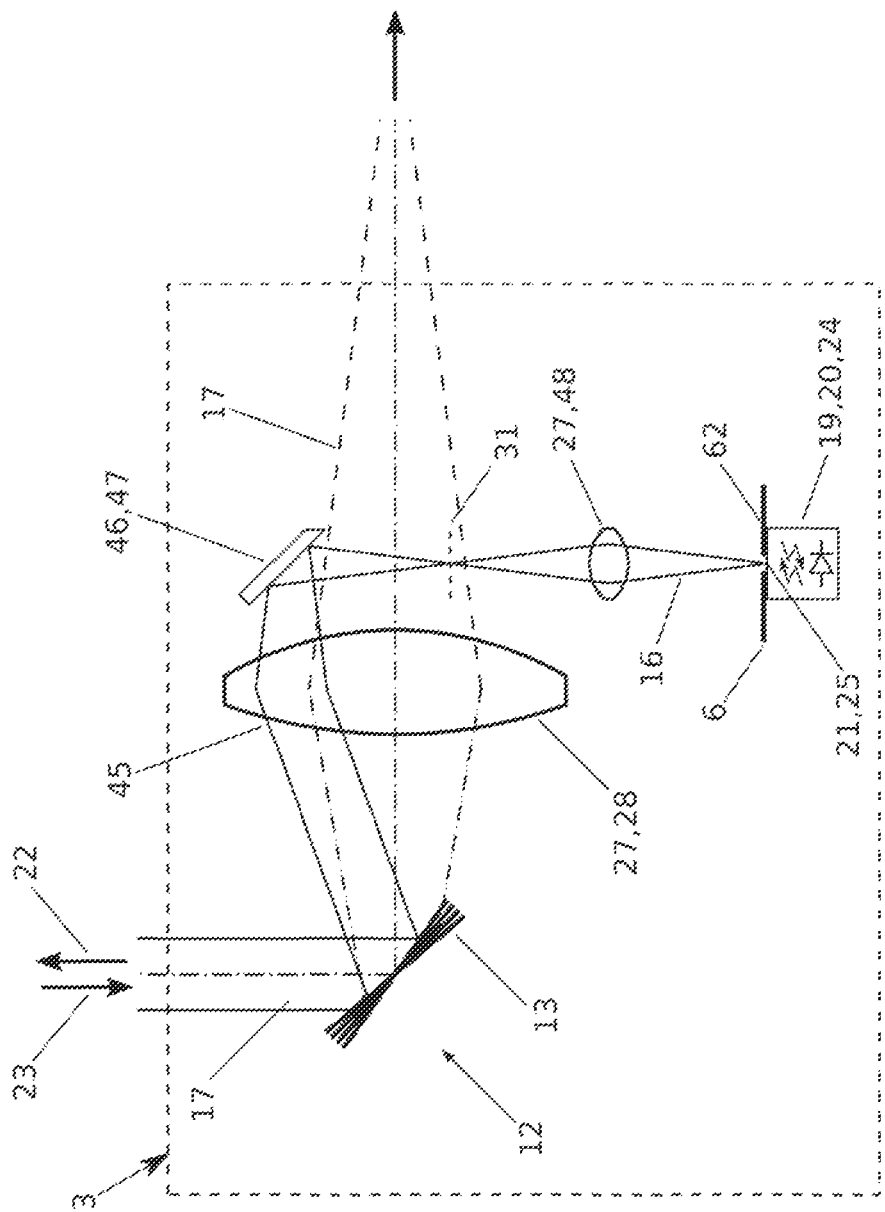
FIG. 6 shows a detail of a fourth embodiment of the microscope assembly according to the present disclosure.

In the detail of a further microscope assembly according to the present disclosure depicted in FIG. 6, the branch 16 branches off in a border area 45 of a scan lens 28 of the focusing optical device 27. By a deflection mirror 46 in form of an edge mirror 47, the illumination light 23 passing through this border area 45 is deflected towards the photoelectric component 19, the illumination light 23 passing through a further lens 48 of the focusing optical device 27 and is thus being focused in the focal plane 6. In this way, a very compact arrangement of the photoelectrical component 19 which both forms the auxiliary light source 20 and the auxiliary detector 24 is achieved within the microscope assembly 3. Further, FIG. 6 illustrates that the auxiliary emission aperture 21 and the auxiliary detection aperture 25 may not only be defined by the auxiliary light source 20 and the auxiliary detector 24, i. e. here by the photoelectric component 19, itself, but also by a further pinhole 62, particularly arranged within the focal plane 16. If the opening of the pinhole 62 is smaller than the light emitting area of the auxiliary light source 20 and the light-sensitive area of the auxiliary detector 24, it defines the auxiliary emission aperture 21 and the auxiliary detection aperture 25.

Figure 7:
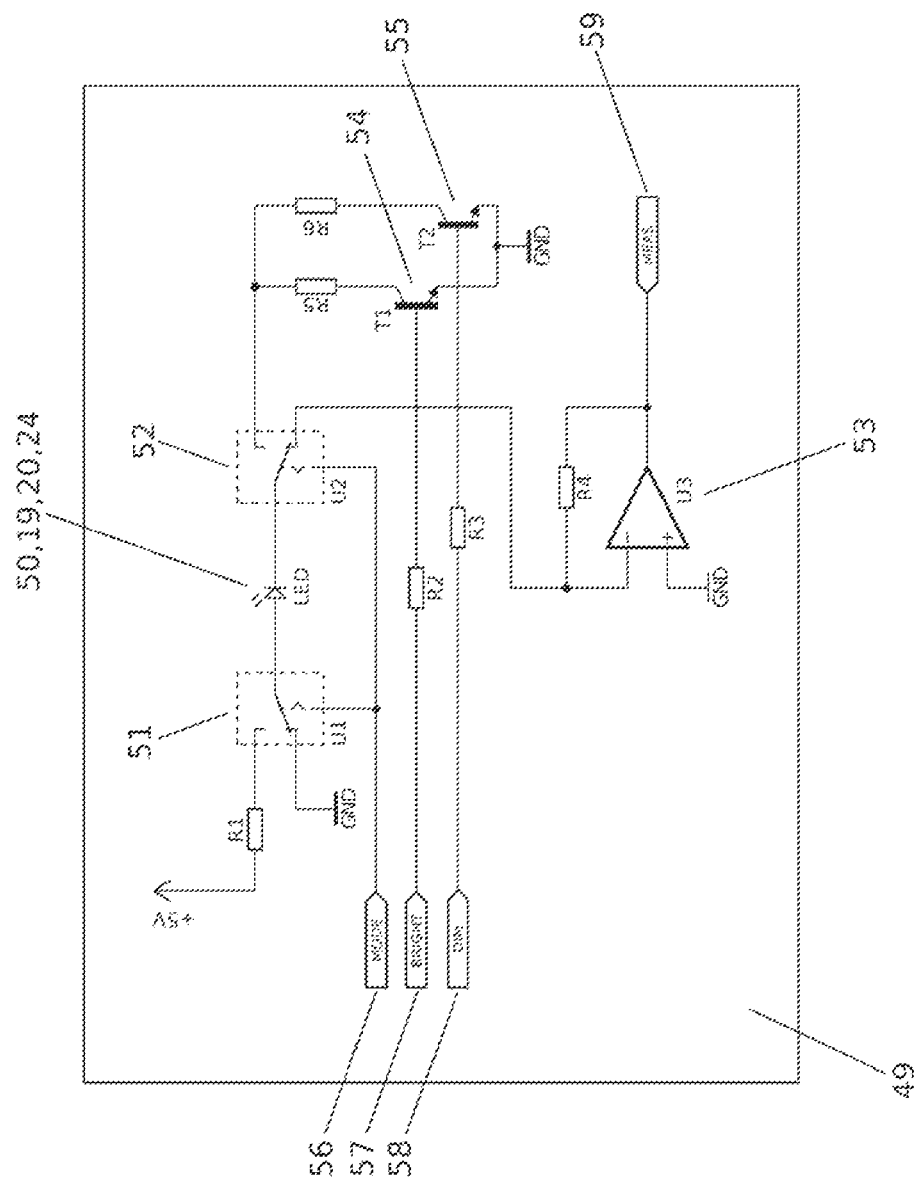
FIG. 7 is a circuit diagram for controlling a light emitting diode which is usable in different embodiments of the microscope assembly according to the present disclosure and the apparatus according to the present disclosure both as an auxiliary detector and as an auxiliary light source.

FIG. 7 shows an example of a driver circuitry 49 for a light emitting diode (LED) 50 for use as the photoelectric component 19, i. e. both as the auxiliary light source 20 and as the auxiliary detector 24. In the switching position of two switches 51 and 52 depicted, the light emitting diode 50 is connected to an operational amplifier for being used at the auxiliary detector 24. When switching over both switches 51 and 52, the light emitting diode 50 is used as the auxiliary light source, the intensity of the auxiliary light being adjustable via two transistors 54 and 55. The operation mode of the light emitting diode 50 is selected via a signal input 56. The intensity of the auxiliary light from the LED 50 is selected via control inputs 57 and 58, and the intensity of the illumination light registered by the light emitting diode 50 used as the auxiliary detector 24 is output at a signal output 59.

Figure 8:
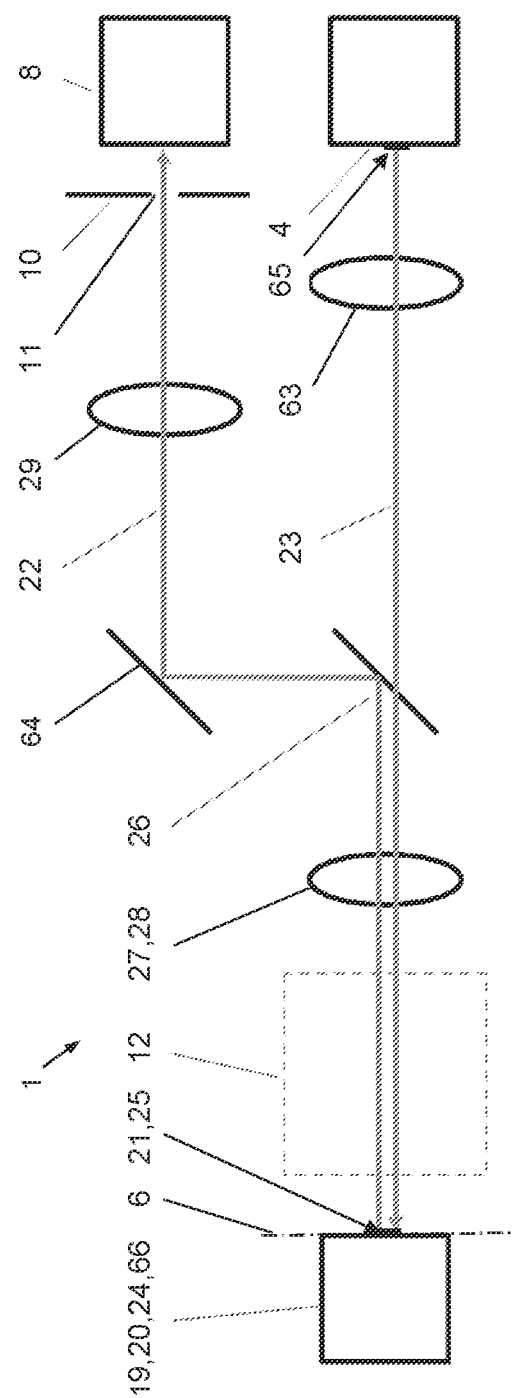
FIGS. 8 to 10 illustrate a first, a second and a third embodiment of the method according to the present disclosure at adapted but only schematically depicted microscope assemblies according to the present disclosure.

FIG. 8 illustrates a first embodiment of the method according to the present disclosure for checking the confocality of the scanning and descanning microscope assembly 1 which is only schematically depicted here. The microscope assembly 1 additionally comprises a deflection mirror 64 for deflecting the detection beam path towards the detector 8 and an additional optical device 63 in the illumination beam path between the light source 4 and the beam splitter 26. Further, an emission aperture 65 of the light source out of which the illumination light 23 exits is depicted, and the electro-optical component 19 is additionally provided with a further reference sign for an auxiliary device 66 to be arranged in the focal plane 6 for executing the method according to the present disclosure.

The first embodiment of the method according to the present disclosure includes the steps that have been explained with reference to FIGS. 1 and 2. This means that, by operating the scanner 12, the auxiliary detection aperture 25 of the auxiliary detector 24 in the focal plane 6 is scanned with the illumination light 23 coming from the light source 4, and, also by operating the scanner 12, the detection aperture 11 of the detector 8 is scanned with the auxiliary light 22 exiting out of the auxiliary emission aperture 21 of the auxiliary light source 20. The two intensity distributions of the illumination light 23 registered by the auxiliary detector 24 for the illumination beam path and the auxiliary light 22 registered by the detector 8 for the detection beam path recorded over the different settings of the scanner 12 are exactly equal, i. e. have same maxima and centers of intensity, if the confocality of the microscope assembly 1 is given.

Figure 9:
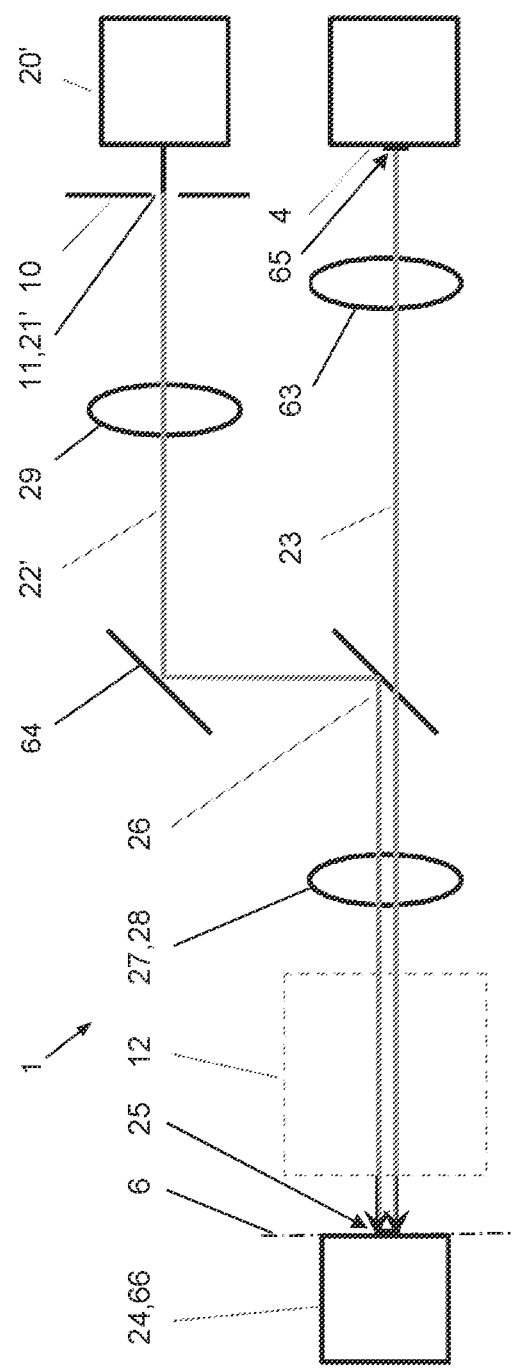

In a second embodiment of the method according to the present disclosure illustrated in FIG. 9, the step of FIG. 2 is executed, i. e. the auxiliary detection aperture 25 of the auxiliary detector 24 in the focal plane 6 is scanned with the illumination light 23 from the light source 4 by operating the scanner 12 to determine the orientation of the illumination beam path. However, the orientation of the detection beam path is not determined by scanning the detection aperture 11 of the detector 8 with auxiliary light 22 which exits out of an auxiliary emission aperture 21 in the focal plane 6 which is concentrically arranged with respect to the auxiliary detection aperture 25. Instead, the direction of the beams through the detection beam path is reversed, and the detector 8 is replaced by an auxiliary light source 20' separate from the auxiliary device 66, whose auxiliary emission aperture 21' is also defined by the opening of the pinhole 10 which otherwise defines the detection aperture 11 of the detector 8. With the auxiliary light 22' exiting out of this auxiliary emission aperture 21', the auxiliary detection aperture 25 of the auxiliary detector 24 in the focal plane 6 is scanned by operating the scanner 12. Then, the intensity distribution of the auxiliary light 22' registered by the auxiliary detector 24 recorded over the different settings of the scanner is the second intensity distribution describing the orientation of the detection beam path which is compared to the orientation of the first intensity distribution describing the orientation of the illumination beam path in checking the confocality of the microscope assembly 1.

Figure 10:
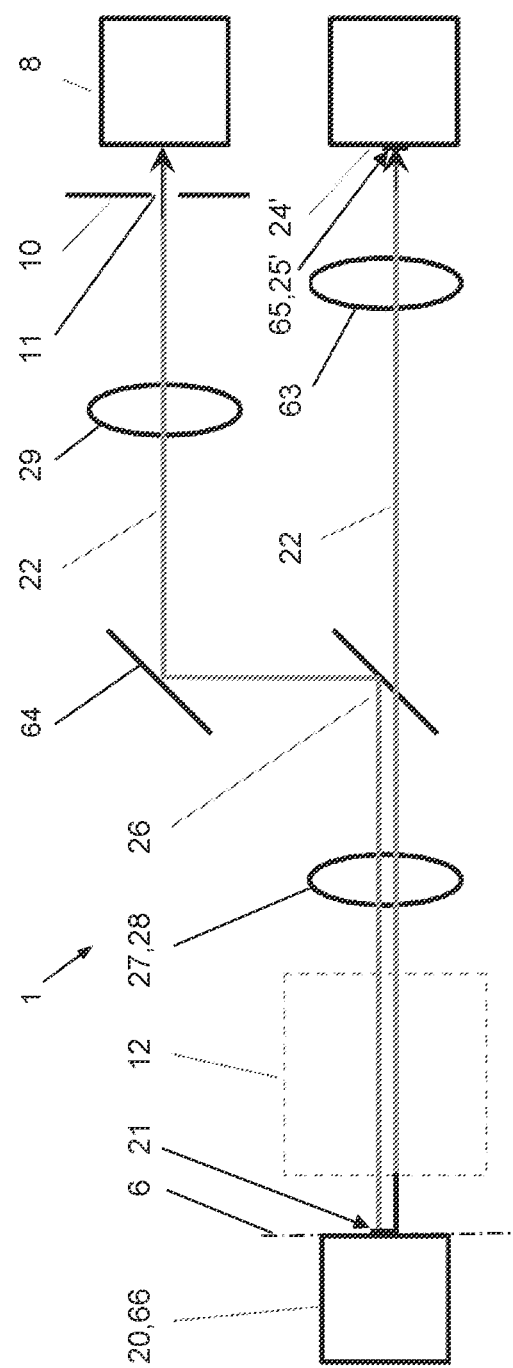

Whereas, in the second embodiment of the method according to the present disclosure illustrated in FIG. 9, the auxiliary device 66 in the focal plane 6 is just the auxiliary detector 24, and a separate auxiliary light source 20' at the position of the detector 8 is utilized, the auxiliary device 66 in the focal plane 6 is just the auxiliary light source 20 in the third embodiment of the method according to the present disclosure illustrated in FIG. 10. With the auxiliary light 22 irradiated by the auxiliary light source 20 through its auxiliary emission aperture 21, the detection aperture 11 of the detector 8 is scanned in the step of FIG. 1 by operating the scanner 12. Further, deviating from the procedure of FIG. 2, with the same auxiliary light 22 over the same different settings of the scanner 12 an auxiliary detection aperture 25' of an auxiliary detector 24' separate from the auxiliary device 66 and arranged at the same location as the light source 4 is scanned. The same location of the light source 4 and the separate auxiliary detector 24, may, for example, be realized in that the emission aperture 65 of the light source 4 and the auxiliary detection aperture 25' of the auxiliary detector 24' are formed by a same surface area of an optical fiber which branches via a circulator towards the light source 4, on the one hand, and the auxiliary detector 24', on the other hand. Thus, in the third embodiment of FIG. 10, the direction of the beams passing through the illumination beam path from the light source 4 to the focal plane 6 is reversed for checking the confocality of the microscope assembly 1. However, the first intensity distribution of the auxiliary light 22 registered by the separate auxiliary detector 24' corresponds to the first intensity distribution otherwise recorded according to FIG. 2 for the illumination beam path and may thus in a same way be compared to the second intensity distribution determined for the detection beam path for checking the confocality of the microscope assembly 1.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of checking the confocality of a scanning and descanning microscope assembly comprising
a light source providing illumination light, wherein the illumination light exits out of an emission aperture of the light source,
a focusing optical device focusing the illumination light into a focal area in a focal plane,
a detector detecting light coming out of the focal area and having a detection aperture to be arranged in a confocal fashion with respect to the focal area, and
a scanner between the light source and the detector on one side, and the focal plane on the other side;
wherein at least one of an auxiliary detector having an auxiliary detection aperture and an auxiliary light source providing auxiliary light and having an auxiliary emission aperture out of which the auxiliary light exits is arranged in the focal plane, wherein, in case that both the auxiliary detector and the auxiliary light source are arranged in the focal plane, the auxiliary detection aperture and the auxiliary emission aperture are concentrically arranged in the focal plane;
wherein either the auxiliary detection aperture of the auxiliary detector arranged in the focal plane is scanned with the focal area of the illumination light by operating the scanner, wherein a first intensity distribution of the illumination light registered by the auxiliary detector is recorded over different settings of the scanner; or an auxiliary detection aperture of a separate auxiliary detector which is arranged concentrically with respect to the emission aperture of the light source is scanned with the auxiliary light that exits out of the auxiliary emission aperture of the auxiliary light source arranged in the focal plane by operating the scanner, wherein a first intensity distribution of the illumination light registered by the separate auxiliary detector is recorded over different settings of the scanner;
wherein either the detection aperture of the detector is scanned with the auxiliary light which exits out of the auxiliary emission aperture of the auxiliary light source arranged in the focal plane by operating the scanner, wherein a second intensity distribution of the auxiliary light registered by the detector is recorded over the different settings of the scanner; or the auxiliary detection aperture of the auxiliary detector arranged in the focal plane is scanned with auxiliary light which exits out of an auxiliary emission aperture of a separate auxiliary light source concentrically arranged with respect to the detection aperture by operating the scanner, wherein a second intensity distribution of the auxiliary light registered by the auxiliary detector is recorded over the different settings of the scanner; and
wherein at least one difference between the first intensity distribution and the second intensity distribution over the different settings of the scanner is determined as a measure of an error of the confocality.

2. The method of claim 1, wherein the at least one difference is a difference in position between maxima or centers of intensity of the first intensity distribution and the second intensity distribution.

3. The method of claim 1, wherein the at least one difference is compensated by a real or virtual relative movement of the detection aperture of the detector with respect to the light source.

4. The method of claim 1, wherein the auxiliary detection aperture and the auxiliary emission aperture which are arranged in the focal plane are arranged in an intermediate image plane of a laser-scanning microscope including the scanning and descanning microscope assembly and an objective lens.

5. The method of claim 1, wherein the auxiliary detection aperture and the auxiliary emission aperture which are arranged in the focal plane are arranged in a branch branching off a main beam path of a laser-scanning microscope including the scanning and descanning microscope assembly and an objective lens.

6. The method of claim 5, wherein the branch branches off at a beam splitter, a deflection mirror or a rotating mirror of the scanner in the main beam path of the laser-scanning microscope, and wherein the focusing optical device focusing the illumination light into the focal area in the focal plane is at least partially arranged within the branch.

7. The method of claim 1, the scanning and descanning microscope assembly comprising
the light source providing the illumination light,
the focusing optical device focusing the illumination light into the focal area in the focal plane,
the detector detecting the light coming out of the focal area and having the detection aperture to be arranged in a confocal fashion with respect to the focal area, and
the scanner between the light source and the detector on one side, and the focal plane on the other side,
wherein the illumination light is directed onto the auxiliary detector via the scanner,
wherein the auxiliary light from the auxiliary light source is directed onto the detector via the scanner,
wherein the auxiliary detection aperture of the auxiliary detector arranged in the focal plane is scanned with the focal area of the illumination light by operating the scanner to record the first intensity distribution of the illumination light registered by the auxiliary detector over the different settings of the scanner, and
wherein the detection aperture of the detector is scanned with the auxiliary light that exits out of the auxiliary emission aperture of the auxiliary light source concentrically arranged with respect to the auxiliary detection aperture in the focal plane by operating the scanner to record the second intensity distribution of the auxiliary light registered by the detector over the different settings of the scanner.

8. The method of claim 7, wherein the auxiliary detection aperture of the auxiliary detector and the auxiliary emission aperture of the auxiliary light source are congruent in the focal plane.

9. The method of claim 7, wherein a same photoelectric component is used both as the auxiliary light source and as the auxiliary detector.

10. The method of claim 7, wherein the auxiliary detection aperture of the auxiliary detector and the auxiliary emission aperture of the auxiliary light source are formed by a terminal cross-section of an optical fiber arranged in the focal plane, wherein the optical fiber is branched towards the auxiliary light source and the auxiliary detector.

11. An apparatus configured for being used in the method of claim 7, the apparatus comprising
the auxiliary detector,
the auxiliary light source, and
a counter-connector fitting to a normalized connector of at least one of a scanning and descanning microscope assembly and a laser-scanning microscope including the scanning and descanning microscope assembly and an objective lens in such a way that an auxiliary detection aperture of the auxiliary detector and an auxiliary emission aperture of the auxiliary light source whose positions are fixed with respect to the counter-connector are arranged in the focal plane of the scanning and descanning microscope assembly with the counter-connector being connected to the connector.

12. A scanning and descanning microscope assembly configured for checking its confocality, the scanning and descanning microscope assembly comprising
a light source providing illumination light, wherein the illumination light exits out of an emission aperture of the light source,
a focusing optical device focusing the illumination light into a focal area in a focal plane,
a detector for light coming out of the focal area and having a detection aperture to be arranged in a confocal fashion with respect to the focal area,
a scanner arranged between the light source and the detector on one side, and the focal plane on the other side, and
at least one of an auxiliary detector having an auxiliary detection aperture and an auxiliary light source providing auxiliary light and having an auxiliary emission aperture out of which the auxiliary light exits in the focal plane, wherein, in case that both the auxiliary detector and the auxiliary light source are arranged in the focal plane, the auxiliary detection aperture and the auxiliary emission aperture are arranged concentrically,
wherein the auxiliary detection aperture of the auxiliary detector in the focal plane is scannable with the focal area of the illumination light or an auxiliary detection aperture of a separate auxiliary detector concentrically arranged with respect to the emission aperture of the light source is scannable with the auxiliary light that exits out of the auxiliary emission aperture of the auxiliary light source arranged in the focal plane by operating the scanner, and
wherein the detection aperture of the detector is scannable with the auxiliary light which exits in the focal plane out of the auxiliary emission aperture of the auxiliary light source, or the auxiliary detection aperture of the auxiliary detector arranged in the focal plane is scannable with auxiliary light which exits through an auxiliary emission aperture of a separate auxiliary light source concentrically arranged with respect to the detection aperture by operating the scanner.

13. The scanning and descanning microscope assembly of claim 12 comprising a checking device configured for
scanning the auxiliary detection aperture of the auxiliary detector in the focal plane with the focal area of the illumination light or the auxiliary detection aperture of the separate auxiliary detector concentrically arranged with respect to the emission aperture of the light source with the auxiliary light from the auxiliary light source in the focal plane by operating the scanner and recording a first intensity distribution of the illumination light registered by the auxiliary detector or the auxiliary light registered by the separate auxiliary detector over different settings of the scanner,
scanning the detection aperture of the detector with the auxiliary light from the auxiliary light source in the focal plane or the auxiliary detection aperture of the auxiliary detector arranged in the focal plane with the auxiliary light exiting out of the auxiliary emission aperture of the separate auxiliary light source concentrically arranged with respect to the detection aperture of the detector by operating the scanner and recording a second intensity distribution of the auxiliary light registered by the detector or of the auxiliary light registered by the auxiliary detector over the different settings of the scanner, and determining at least one difference between the first intensity distribution and the second intensity distribution over the different settings of the scanner as a measure of an error of the confocality.

14. The scanning and descanning microscope assembly of claim 13, wherein the checking device is configured for automatically compensating the at least one difference by a real or virtual relative movement of the detection aperture of the detector with respect to the light source.

15. The scanning and descanning microscope assembly of claim 12, wherein the auxiliary detection aperture of the auxiliary detector and the auxiliary emission aperture of the auxiliary light source and the separate auxiliary light source are arranged in a housing of the scanning and descanning microscope assembly.

16. The scanning and descanning microscope assembly of claim 12, wherein the auxiliary light source and the auxiliary detector are arranged in a housing of the scanning and descanning microscope assembly.

17. The scanning and descanning microscope assembly of claim 12, comprising the light source providing the illumination light, the focusing optical device focusing the illumination light in the focal area in the focal plane, the detector for the light coming out of the focal area and having the detection aperture to be arranged in a confocal fashion with respect to the focal area, the scanner between the light source and the detector on one side, and the focal plane on the other side, the auxiliary detector onto which the auxiliary light is directable via the scanner, and the auxiliary light source providing the auxiliary light whose auxiliary light is directable onto the detector via the scanner, wherein the auxiliary detection aperture of the auxiliary detector and the auxiliary emission aperture out of which the auxiliary light from the auxiliary light source exits are concentrically arranged in the focal plane in such a way that the auxiliary detection aperture is scannable with the focal area of the illumination light by operating the scanner and the detection aperture of the detector is scannable with the auxiliary light from the auxiliary light source by operating the scanner.

18. The scanning and descanning microscope assembly of claim 17, wherein the auxiliary light source and the auxiliary detector are a same photoelectrical component, wherein the photoelectrical component is one of a light emitting diode, a super-luminescence diode, a laser diode and a photodiode.

19. The scanning and descanning microscope assembly of claim 17, wherein the auxiliary detection aperture of the auxiliary detector and the auxiliary emission aperture of the auxiliary light source are formed by a terminal cross-section of an optical fiber arranged in the focal plane, wherein the optical fiber is branched towards the auxiliary light source and the auxiliary detector via a beam splitter or a circulator.

20. A Laser-scanning microscope comprising an objective and a scanning and descanning microscope assembly of claim 17, wherein the auxiliary detection aperture of the auxiliary detector and the auxiliary emission aperture of the auxiliary light source are arranged in an intermediate image plane of the laser-scanning microscope.

21. A Laser-scanning microscope comprising an objective and a scanning and descanning microscope assembly of claim 17, wherein the auxiliary detection aperture of the auxiliary detector and the auxiliary emission aperture of the auxiliary light source are arranged in a branch branching off a main beam path of the laser-scanning microscope.

22. The laser-scanning microscope of claim 21, wherein the branch branches off at a beam splitter, a deflection mirror or a rotating mirror of the scanner in the main beam path of the laser-scanning microscope.

23. The laser-scanning microscope of claim 21, wherein the focusing optical device focusing the illumination light into the focal area in the focal plane is at least partially arranged in the branch.

* * * * *